Jan. 11, 1966     W. T. COX     3,228,350
GUIDING APPARATUS FOR OPERATING HIGHWAY
VEHICLES ON RAILROAD TRACKS
Filed May 12, 1961     3 Sheets-Sheet 1
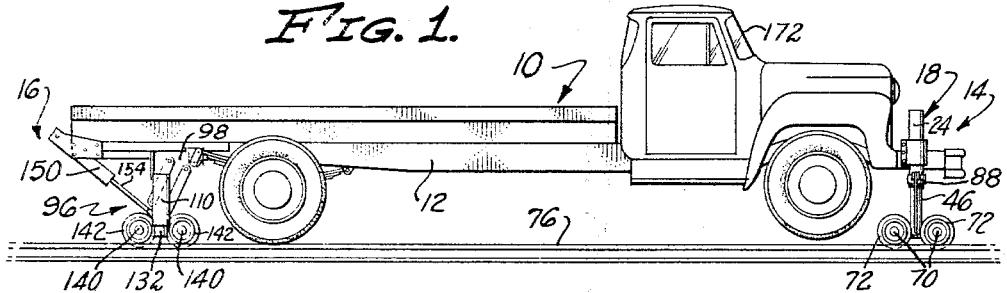
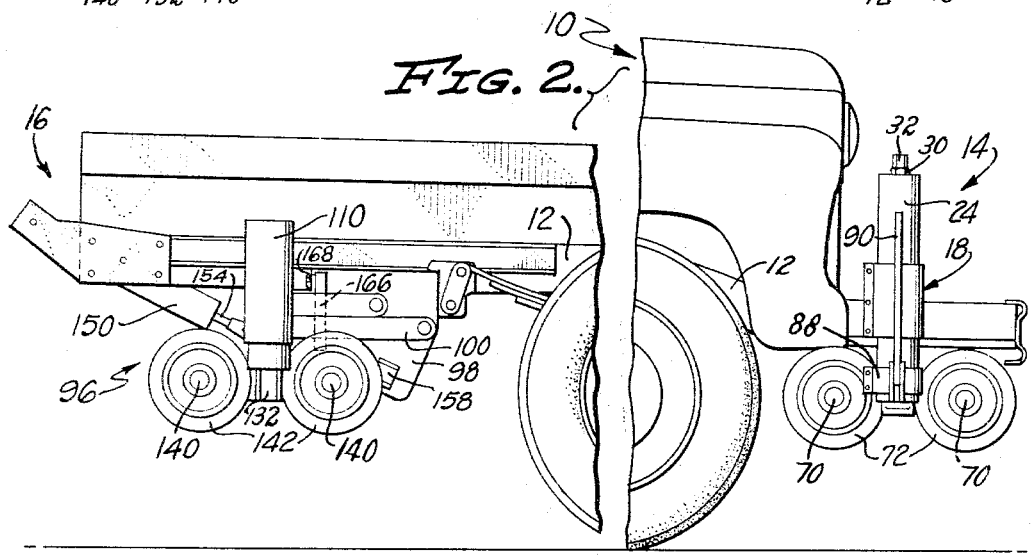
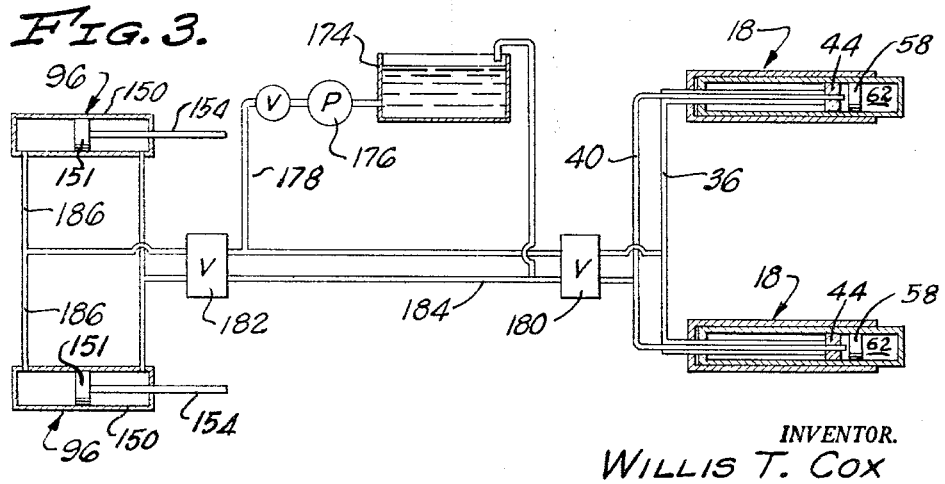
INVENTOR.
WILLIS T. COX
BY
O'BRIAN & BLACKHAM
ATTORNEYS

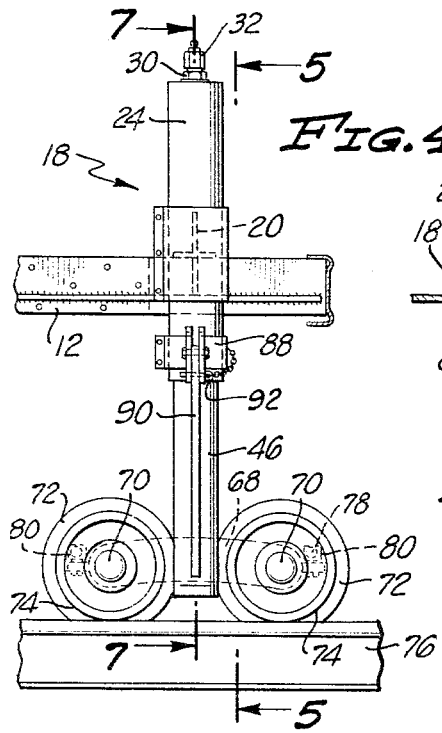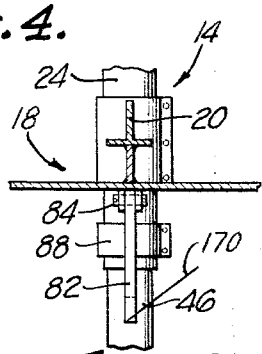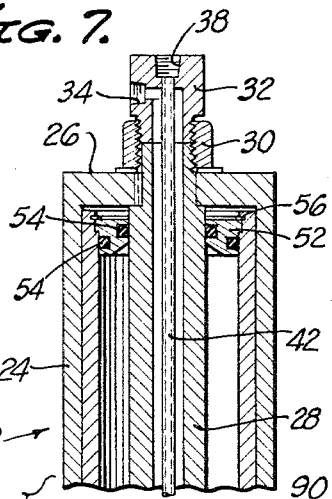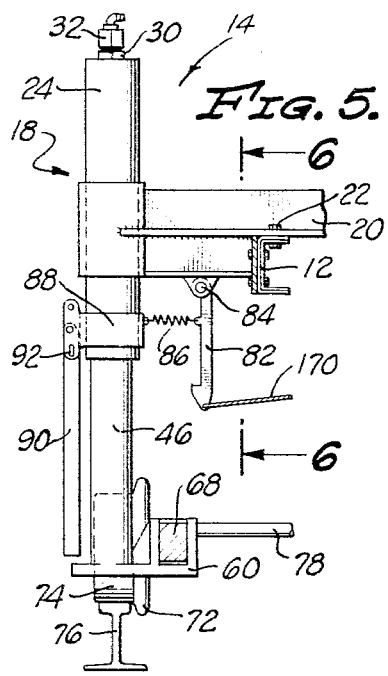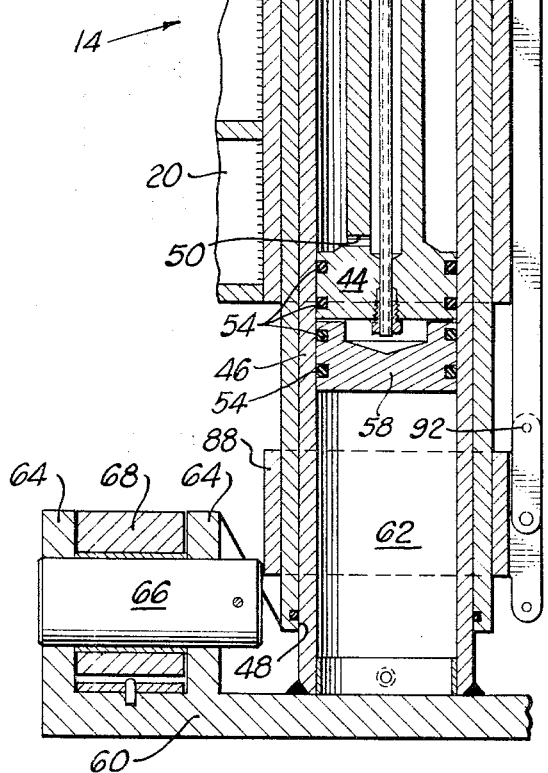

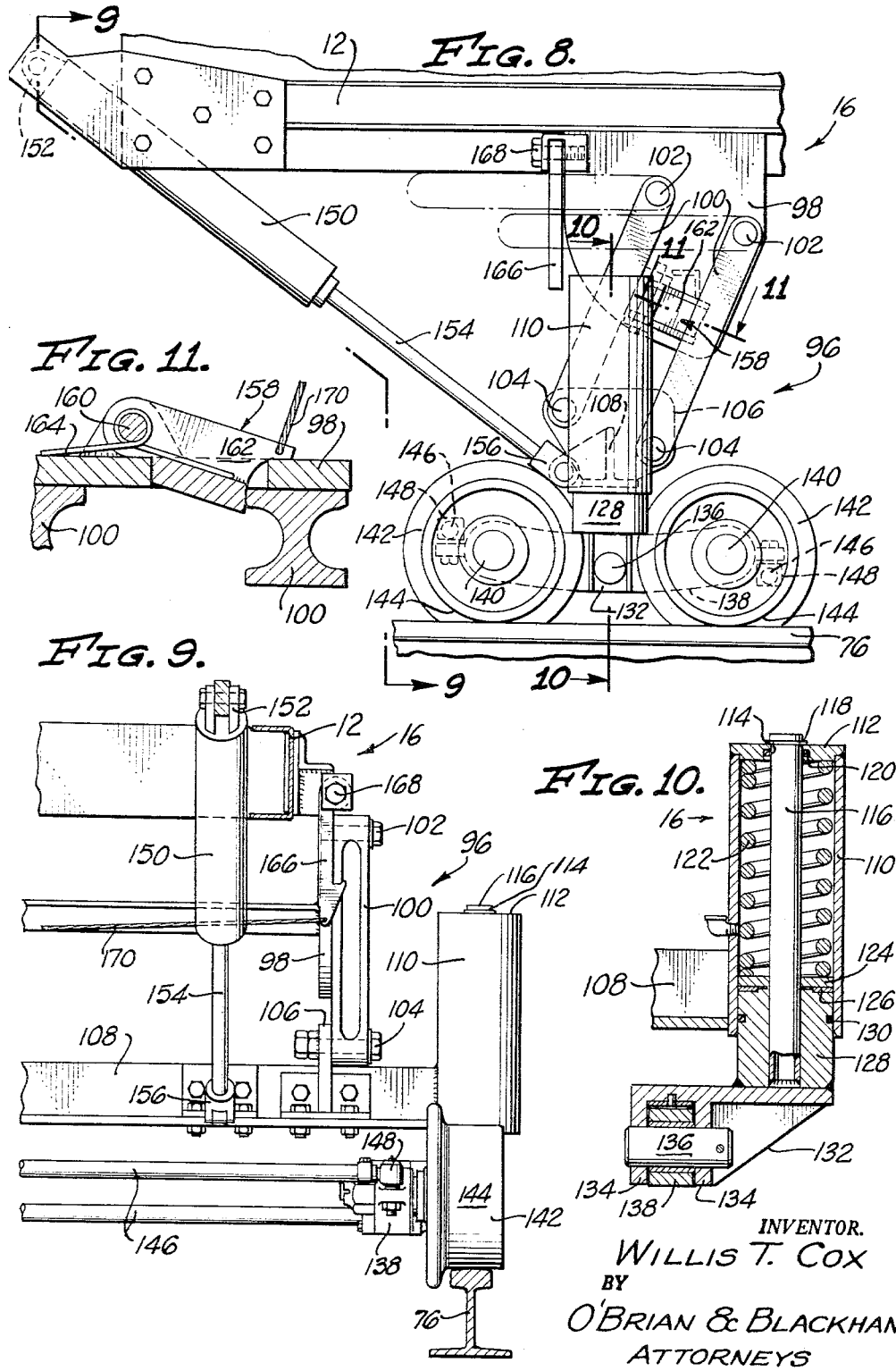

United States Patent Office 3,228,350
Patented Jan. 11, 1966

1

3,228,350
GUIDING APPARATUS FOR OPERATING HIGH-
WAY VEHICLES ON RAILROAD TRACKS
Willis T. Cox, 1021 Fruit St., Santa Ana, Calif.
Filed May 12, 1961, Ser. No. 109,577
3 Claims. (Cl. 105—215)

This invention pertains to new and improved apparatuses for operating automotive type vehicles such as trucks upon railroad rails.

In the past various types of railroad maintenance and related operations have been carried out utilizing conventional railroad type cars or the equivalent upon railroad rails. For a number of reasons which are not related to an understanding of the present invention it is frequently desired to carry out many of these operations utilizing conventional type automotive vehicles, especially trucks, which are equipped so as to be capable of operating upon a railroad track. Because of weight and other problems the satisfactory operation of trucks and similar automotive type vehicles upon railroad rails so as to utilize the engines in such vehicles as a source of motive power has presented a number of different problems. Many of these problems are a direct outgrowth of the fact that a truck is a heavy piece of equipment and that the means used in supporting a truck upon railroad rails must be capable of withstanding such weight in a manner permitting satisfactory operation of the vehicle.

A broad object of the present invention is to provide new and improved apparatus for operating automotive vehicles such as trucks upon railroad rails. A related generalized object of this invention is to provide apparatus which overcomes problems of the type suggested in the foregoing brief discussion. Another related object of this invention is to provide new and improved apparatus of the intended type including specific structures for engaging the railroad rails as at the corners of a vehicle such as a truck and to provide devices utilizing several of such structures which are adapted to operate the structures at an end of a vehicle together, and which are intended so as to adequately support and control the movement of an end of an automotive vehicle upon railroad rails. A further object of the present invention is to provide a complete apparatus including devices as indicated in the preceding at the front and rear ends of an automotive type vehicle such as a truck.

Various related objects of the present invention are to provide apparatuses, devices and structures as briefly indicated in the preceding paragraph which may be easily and conveniently attached to or mounted upon an automotive vehicle such as a truck, which may be constructed at a nominal cost, and which are capable of rendering satisfactory, prolonged service when used for their intended purposes.

These and various other objects and advantages of this invention will be more fully apparent from a detailed consideration of the remainder of this specification, including the appended claims, and from a detailed consideration of the accompanying drawings in which:

FIG. 1 is a side elevational view of a truck utilizing a complete apparatus of this invention so as to be supported upon a pair of railroad rails;

FIG. 2 is an enlarged side elevational view showing part of this same truck and showing the same apparatus illustrated in FIG. 1 when the truck is being supported upon its own wheels;

FIG. 3 is a schematic illustration of the hydraulic system employed with the apparatus of this invention;

FIG. 4 is a side elevational view of a device used in the apparatus illustrated in FIGS. 1 and 2 at the front of an automotive vehicle;

FIG. 5 is a cross-sectional view taken at line 5—5 of FIG. 4;

FIG. 6 is a cross-sectional view taken at line 6—6 of FIG. 5;

FIG. 7 is a cross-sectional view of parts shown in FIG. 4 in different operative positions than the positions shown in FIG. 4, this FIG. 7 corresponding to a cross-sectional view taken at line 7—7 of FIG. 4;

FIG. 8 is a view, similar to FIG. 4, of another device used in an apparatus of this invention;

FIG. 9 is a cross-sectional view taken at line 9—9 of FIG. 8;

FIG. 10 is a cross-sectional view taken at line 10—10 of FIG. 8; and

FIG. 11 is a cross-sectional view taken at line 11—11 of FIG. 8.

The accompanying drawings are primarily intended so as to clearly illustrate and explain a presently preferred embodiment of a complete apparatus of this invention for operating an automotive vehicle upon railroad rails. Various changes of a routine engineering character may be made in this complete apparatus, and various parts of it are shown in the accompanying drawings, without departing from the essential features of this invention as set forth in the appended claims. For this reason the accompanying drawings are not to be taken as defining the limits of the present invention.

As an aid to understanding this invention it can be stated in essentially summary form that it concerns a complete apparatus for operating an automotive vehicle upon railrod rails, and that it concerns devices adapted to be mounted upon ends of an automotive vehicle for this same generalized purpose, and specific structures used in such devices for engaging a single railroad rail. In accordance with this invention each said such structures include a support, means for securing this support to a vehicle, a first member mounted on the support so as to be capable of rotating about a vertical axis, a second member secured to the first member so as to be capable of rotating about a horizontal axis, and wheel means for engaging a railroad rail mounted upon this second member. Structures of the present invention also include means for raising and lowering the second member and the wheels in each of these structures with respect to a vehicle frame. From a consideration of the remainder of this specification it will be realized that when two of these structures are used in a device at one end of an automotive vehicle they are connected together so that the wheels in the structures in each of these devices rotate in planes parallel to one another and so that the wheels in these structures may be raised and lowered simultaneously.

The actual details of this invention are best more fully explained by referring directly to the accompanying drawings. In these drawings there is shown a common type of automotive vehicle, a truck, 10 having a frame 12 and having front and rear ends (not separately numbered). At the front of this frame there is attached to it as hereinafter described a front device 14 and at the rear of this frame 12 there is attached to it as hereinafter explained a rear device 16.

The front device 14 consists of two generally parallel structures 18, one of which is shown in FIGS. 4 through 7 of the drawings. These structures 18 are connected by means of a cross rigid member 20 which is attached to the frame 12 as through the use of bolts 22 (FIG. 5). The cross member 20 carries at each of its ends a cylindrical support 24 disposed in a vertical direction. Each of the supports 24 has a closed upper end 26 which carries an elongated control tube 28. This tube may conveniently be secured in place so as to extend along the axis of the supoprt 24 through the use of a locknut 30 located on the exterior of the end 26.

A small fitting 32 designed to be used in supplying hydraulic fluid to the interior of the support 24 may be threaded upon the locknut 30 as shown in FIG. 7 so as to be in communication with the interior of the tube 28. This fitting 32 carries an inlet 34 which leads directly into the interior of the tube 28 and which is adapted to be connected to a hydraulic line 36 as indicated in FIG. 3 of the drawings. This fitting 32 also carries another inlet 38 which is adapted to be connected to another hydraulic line 40 also as indicated in FIG. 3. The fitting 32 carries a second tube 42 which is in direct communication with the inlet 38 and which extends completely through the interior of the tube 28 and through an enlarged piston 44 formed on the end of the tube 28 located within the interior of the support 24. This piston 44 fits closely against the interior of a cylindrical member 46. This cylindrical member 46 may be referred to hereinafter as a first member because of its inner relationship with the cylindrical support 24. It fits closely against the interior of this support 24 and extends out of an open lower end 48 of the support 24.

From an examination of FIG. 7 of the drawings it will be apparent that by virtue of the construction of the support 24 and the manner in which the member 46 fits within this support that the member 46 is pivotally mounted upon the support 24 so as to be capable of rotating about a vertical axis, and that the member 46 is also capable of being moved in a vertical manner with respect to the support 24. As will be noted in FIG. 7 of the drawings the extremity of the tube 42 extends completely through the piston 44 and terminates at the end of the piston 44 generally adjacent to the lower end 48. With this construction hydraulic fluid from the inlet 38 is isolated from hydraulic fluid introduced into the tube 28 through the inlet 34.

Any hydraulic fluid introduced into the tube 28 through the inlet 34 is conveyed out of the tube 28 through a small passage 50 located adjacent to the piston 44 into the interior of the member 46 so as to be confined within this member 46 between the piston 44 and the uppermost end of the member 46. This uppermost end (not separately numbered) of the member 46 is closed by means of a small cap plate 52 which holds conventional O-ring seals 54 against the interior of the member 46 and against the exterior of the tube 28. A small snap ring 56 may conveniently be used to lock the plate 52 in position. From this it will be seen that the plate 52 is located about the tube 28 so that the entire member 46 is capable of being moved in a vertical direction as previously indicated. Other seals 54 are located on the periphery of the piston 44 so as to prevent the loss of hydraulic fluid between this piston 44 and the interior of the cylindrical member 46.

Within the interior of the cylindrical member 46 directly opposite the piston 44 on the side of this piston remote from the tube 28 there is located another "free floating" piston 58 having conventional O ring seals 54 which is capable of being moved within the interior of this member 46. With this structure the introduction of hydraulic fluid through the inlet 38 is capable of moving the piston 58 away from the other piston 44. A support or first member 60 secured to the extremity of the member 46 adjacent to the end 48 encloses the end of the member 46 adjacent to the piston 58 so as to form an enclosed air chamber 62 holding air so that such air is capable of acting as an air spring when the pistons 44 and 58 are moved away from one another, compressing the air within the chamber 62 through the movement of hydraulic fluid into the space between these pistons 44 and 58.

The support 60 carries upstanding plates 64 which in turn carry a pivot pin 66. This pivot pin 66 rotatably carries the center of an elongated member 68. This member 68 may, for convenience of designation, be referred to as a second member. Axles 70 are attached to the member 68 equidistant from the pin 66 on each side of the support 24 and the member 46. These axles 70 are of a conventional character, and carry in an established manner wheel units 72. These wheel units are preferably constructed as set forth in the co-pending application, now patent No. 3,044,820, entitled "Wheel Units." The axles 70 are mounted upon the member 68 so as to extend parallel to one another and so as to extend horizontally; these wheel units 72 are held upon the axles 70 in such a manner that when a line is drawn between the centers of their bearing surfaces 74 which rest against a railroad rail 76 this line intersects the vertical axes of the support 24 and the cylindrical member 46. This type of construction is considered to be highly desirable inasmuch as it minimizes any bending moments which might be encountered and which might tend to cause permanent or temporary deformation of various parts as previously described so as to deform such parts in such a manner that they do not operate satisfactorily.

In the front device 14 the two front structures 18 are connected together through the use of tie rods 78. These tie rods 78 extend parallel to one another and are connected to the extremities of the member 68 in each of the two structures 18 utilized in the front device 14 by means of universal joints 80. The tie rods 78 serve to maintain all of the wheel units 72 of the front device 14 parallel to one another during the use of the complete apparatus of this invention for its intended purpose in supporting the truck 10 upon the rails 76 shown.

Each of the front structures 18 preferably also includes in addition to the foregoing a latch 82 (FIG. 5) mounted upon the cross member 20 by means of a pivot pin 84. The latches 82 are biased generally toward the members 46 through the use of conventional springs 86. These latches 82 are located so as to engage the supports 60 when the wheel units 72 are raised so that the truck 10 may be operated on the ground as indicated in FIG. 2 of the drawings in order to prevent any chance of these wheel units 72 dropping down and interfering with the operation of the truck.

Each of the front structures 18 also includes a small bracket 88 mounted upon the support 24 for the purpose of rotatably holding a safety rod 90. In each of the front structures 18 the safety rod 90 is capable of being locked into a downwardly extending, vertical position as indicated in FIG. 5 through the use of a cotter pin 92 or equivalent so as to be capable of engaging the support 60 in the eventuality that the structure 18 fails to function in its desired manner when the truck 10 is used upon the rails 76 so as to hold the wheel units 72 in contact with these rails. By appropriate manipulation of the cotter pin 92 the safety rod 90 may be rotated to an upwardly extending position as indicated in FIG. 2 of the drawings and may be secured in this position as indicated in FIG. 2 of the drawings and may be secured in this position through engagement of the cotter pin 92 with the bracket 88.

The rear device used in conjunction with the truck 10 includes two rear structures 16 which roughly correspond to the front structures 18 previously described. Each of these rear structures 96 includes a bracket 98 adapted to be secured to the frame 12 as by welding or the like. Each bracket 98 carries parallel links 100 of identical length which are attached to it by means of conventional pivot pins 102. Other pins 104 pivotally secure these links 100 to a support 106 in each of the structures 96. Each of the supports 106 is secured to an elongated cross member 108 which extends between the two structures 96 employed and which, in effect, constitutes a part of each of these structures 96.

In each of the structures 96 at the end of the cross member 108 there is located a vertically extending cylinder 110 having a closed upper end 112. The upper end 112 in a cylinder 110 is provided with a centrally located aperture 114 (FIG. 10) which holds a guide rod 116 so that it (the guide rod 116) is capable of moving in a vertical direction with respect to the cylinder 110. A small split ring 118 may be provided on the extremity of the rod 116 for the purpose of preventing the rod 116 from sliding completely through the aperture 114. If desired, a conventional seal 120 of the O-ring type may be located within the end 112 around the aperture 114 for the purpose of preventing contamination. Within the cylinder 110 a conventional coil spring 122 is located around the rod 116 so that one end of this spring bears against the end 112.

The other end of this spring 122 bears against a bearing plate 124 of a disc-like shape. This plate 124 is in turn supported upon a small bearing ring 126 which in turn bears upon an end of a piston 128. The piston 128 is slidably mounted at the extremity of the cylinder 110 remote from the end 112. A conventional seal 130 may be located in the periphery of the piston 128 between it and the cylinder 110. This piston 128 is secured to the rod 116 as shown. This type of structure is designed so that the spring 122 will exercise a cushioning or shock-absorbing effect and so that the piston 128 may be rotated about the vertical axis of the cylinder 110 during the use of a rear structure 96.

This rear structure 96 incluudes a support 132 roughly corresponding to the support 60 previously described; if desired, this support 132 may be termed a "first member" for convenience of understanding this structure 96. This support 132 is provided with plates 134 which carry a pin 136. This pin 136 rotatably holds an elongated member 138. If desired, this elongated member 138 may be termed a "second member"; it is held by the pin 136 so as to be capable of being rotated about a horizontal axis. This member 138 carries conventional axles 140 located equidistant from the axis of the cylinder 110 in a conventional manner support wheel units 142 corresponding to the wheel units 72 so that these wheel units 142 are capable of rotating about parallel horizontal axes. In the rear structures 96 the wheel units 142 are disposed so that if a line is drawn between the centers of their bearing surfaces 144 which are designed to engage a railroad rail 76 this line intersects the axis of the cylinder 110 at a right angle. This type of structure is designed for supporting purposes as previously explained in conjunction with the front structures 18.

In the rear device 16 the extremities of the members 138 are connected together by means of tie rods 146 which are secured to these members 138 by means of conventional universal or ball-and-socket joints 148. Each of the rear structures 96 includes a hydraulic cylinder 150 having an end 152 pivotally attached to the frame 12. Each of the cylinders 150 utilized carries a conventional internal piston 151, see FIG. 3, which in turn attaches to a conventional connecting rod 154. In a rear structure 96 the extremity of the rod 154 is rotatably attached to the cross member 108 through the use of an appropriate conventional connector 156.

Each of the structures 96 also includes a latch member 158 which is adapted to engage one of the links 100 so as to maintain the entire structure 96 in the position shown in FIG. 8 of the drawings when it is being used for its intended purpose with respect to rail 76. This latch 158 may be constructed as illustrated in FIG. 11 so as to include a pivot pin 160 mounted upon the bracket 98 and a latch arm 162 pivotally mounted upon this pin 160. A common type of spring 164 is held about the pin 160 so as to engage the bracket 98 and the arm 162 in order to bias this arm 162 in a position in which it will spring outwardly so as to prevent rotation of the links 100 toward the frame 12 when an entire structure 96 is located in a position as indicated in FIGS. 1 and 8.

Another latch 166 is mounted about a pin 168 attached to the bracket 98 so as to engage one of the links 100 when a structure 96 is moved to a position as shown in FIG. 2 and by operation of the hydraulic cylinder 150 so as to rotate these links 100 generally parallel to the frame 12 as indicated in FIG. 2 of the drawings. This latch 166 is normally held vertically by its own weight and, hence, normally need not be biased by a separate spring so as to "pick up" one of the links 100 when these links are moved to a position as indicated in FIG. 2.

In the complete apparatus of this invention illustrated in the drawings conventional control cables 170 are attached to the latches 158, 166 and 82 in a conventional manner, and are also connected in a conventional manner to the cab 172 of the truck 10 so that they can be operated during the raising and lowering of the front and rear devices 14 and 16 as required.

In order to raise and lower these devices a hydraulic circuit is utilized as indicated in FIG. 3 of the drawings. This hydraulic circuit includes conventional reservoir 174 for hydraulic fluid and a pump 176 attached to this reservoir 174 so as to supply fluid under pressure to a supply line 178. This supply line leads to front and rear control valves 180 and 182 which are both mounted preferably in the cab 172 so as to be capable of being actuated by the driver of the truck 10. The front valve 180 is attached to the hydraulic lines 36 and 40 as shown so as to be capable of being actuated in order to supply hydraulic fluid to either of the inlets 34 and 38 as may be desired in operating the front structures 18 so as to raise and/or lower these structures. The valve 180 is constructed in such a manner that during such operations hydraulic fluid is returned to the reservoir 174 through a return line 184. The other valve 182 is connected to hydraulic lines 186 which are connected to the extremities of the cylinders 150 in the rear structures 96 as indicated in FIG. 3 so that these cylinders may be operated in a conventional manner. The valve 182 is, of course, connected to the return line 184 as shown.

Because of the nature of this invention it is to be considered as being limited solely by the appended claims forming a part of this disclosure. From a detailed consideration of this specification those skilled in the art to which this invention pertains will realize that the essential features embodied within the structures, devices and the complete apparatus shown may be utilized in a number of different manners in accordance with the broad teachings set forth in this specification.

I claim:

1. An apparatus for operating an automotive vehicle having a frame upon railroad tracks, said frame having front and rear ends, steerable wheels secured to said frame adjacent said front end of said frame and propulsion wheels secured to said frame adjacent said rear end of said frame, first and second supports, first and second wheels respectively mounted on said first and second supports, said first and second wheels being each adapted to engage a railroad rail to guide said vehicle when moving along a railroad rail, the improvement comprising: first and second pivots fixedly mounted with respect to said frame at each side thereof, third and fourth pivots mounted on each of said supports, the distance between said first and second pivots equalling the distance between said third and fourth pivots, first and second links, said first link being pivoted on said first and third pivots and said second link being pivoted on said second and fourth pivots, said first and second links being arranged so that the distance between said first and third pivots is equal to the distance between said second and fourth pivots so that said supports are constrained to move parallelogrammically with respect to said first and second pivots, and a cylinder having a piston and piston rod therein, said cylinder and said piston rod being respectively pivoted to said frame and to at least one of said supports so that movement of said piston rod with respect to said cylinder causes parallelogrammic movement of said support with respect to said first and second pivots.

2. The apparatus of claim 1, wherein said first and second pivots are detachably secured to said frame and said cylinder is detachably pivoted to said frame.

3. The apparatus of claim 2, wherein said first and second elongated members rotatably each carry first and second wheels adapted to engage railroad rails, a spring positioned between each of said elongated members and said supports so that parallelogrammic motion of said supports causes flexure of said springs after said first and second wheels engage upon the railroad rail.

References Cited by the Examiner

UNITED STATES PATENTS

| | | | |
|---|---|---|---|
| 1,512,755 | 10/1924 | Galbraith | 105—215 |
| 2,116,525 | 5/1938 | Luce | 105—215 |
| 2,140,421 | 12/1938 | Fageol | 105—215 |
| 2,377,768 | 6/1945 | Edgar | 105—179 |
| 2,482,564 | 9/1949 | Townsend | 105—215 |
| 2,573,165 | 10/1951 | Settles | 105—19 |
| 2,642,008 | 6/1953 | Settles et al. | 105—19 |
| 2,655,873 | 10/1953 | McDonald | 105—19 |
| 2,705,633 | 4/1955 | Potter et al. | 105—197 |
| 2,889,784 | 6/1959 | Shafer | 105—197 |
| 2,896,553 | 7/1959 | Whistler | 105—215 |
| 2,968,260 | 1/1961 | Scheldrup | 105—215 |
| 2,986,102 | 5/1961 | Cox | 105—215 |
| 3,003,433 | 10/1961 | Hoppe et al. | 105—215 |

FOREIGN PATENTS

| | | |
|---|---|---|
| 50,013 | 4/1939 | France. |
| 785,812 | 5/1935 | France. |

ARTHUR L. LA POINT, *Primary Examiner.*

JAMES S. SHANK, PHILIP ARNOLD, LEO QUACKENBUSH, EUGENE G. BOTZ, *Examiners.*